Patented Dec. 12, 1950

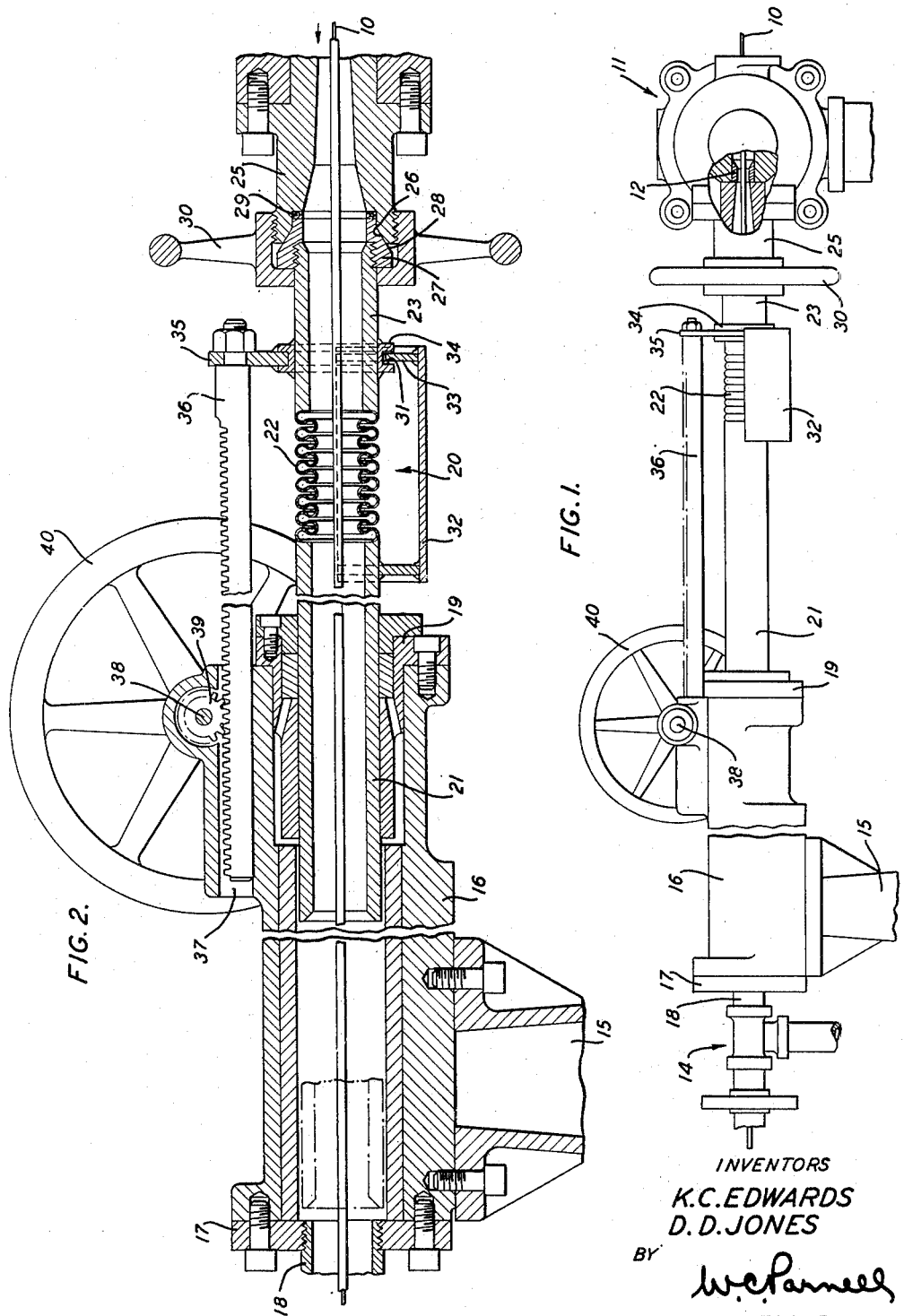

2,533,923

UNITED STATES PATENT OFFICE 2,533,923

CONNECTING MECHANISM

Karl C. Edwards, Chase, Md., and David D. Jones, Weston, Conn., assignors to Western Electric Company, Incorporated, New York, N. Y., a corporation of New York Application December 21, 1946, Serial No. 717,670

9 Claims. (Cl. 18—6)

This invention relates to connectors, and more particularly to mechanisms for connecting extrusion heads with steam chambers in wire vulcanizing machines.

Machines employed for continuously extruding and vulcanizing rubber coverings on wires usually employ a closed connector between the extrusion head and the steam chamber through which the wire travels. This connector is sometimes called a splice box in that it sometimes must be partially removed or opened to facilitate splicing of the wires when they become broken while advancing through the machine. During such instances, it is important, upon closing the splice box, that a perfect seal be formed.

An object of the invention is to provide a connector for a vulcanizing machine which may be readily opened when required and easily reclosed to restore a perfect seal between the connected members.

With this and other objects in view, the invention comprises a connector interposed between two units of an extruding machine and forming a continuous passageway for an extruded wire between the units. In one embodiment of the invention, the connector includes a tubular member having a flexible portion, a head mounted on one end of the tubular member and a threaded element rotatable on the tubular member and engaging a threaded end of an adapter on the extrusion head to force the head into intimate engagement with the adapter, the flexible portion of the tubular member making it possible for the head to find its seat on the adapter to form a perfect seal.

The tubular member, when disengaged from the adapter, is movable longitudinally away from the extrusion head through the rotation of a hand wheel, rotating a pinion at a fixed position, to move a rack connected to the tubular member and thus move the tubular member into its open position to expose the ends of the wires for splicing, the hand wheel, pinion and rack also functioning to close the splice box or connecting mechanism with the exception of the final connecting means between the head and the adapter which includes a threaded element. In the present embodiment, the adapter is provided with a frusto-conical surface to receive a portion of the head mounted on the tubular member, the head also being provided with a frusto-conical surface, both surfaces cooperating to center the head in the adapter so that the end of the head engages a gasket to form a perfect seal.

Other objects and advantages will be apparent from the following detailed description when considered in conjunction with the accompanying drawing, wherein Fig. 1 is a fragmentary side elevational view of a continuous extruding and vulcanizing machine including a connector embodying the invention, and Fig. 2 is an enlarged fragmentary vertical sectional view of portions of the machine illustrating the invention.

Referring now to the drawing, attention is first directed to Fig. 1 which illustrates the essential portions of a continuous insulating and vulcanizing machine immediately associated with a connector embodying the invention. A wire 10, to be insulated, is advanced to the left through an extrusion head 11 where a rubber compound, or other suitable insulating material, is extruded on to the wire as it passes through an extrusion die 12. The insulating material extruded on the wire must receive subsequent treatments before it is exposed to the atmosphere and for this reason, a sealed passageway is provided between the extrusion head 11 and a steam chamber 14.

This intermediate mechanism embodies the invention and includes a supporting bracket 15 upon which a housing 16 is mounted, one end of the housing being partially closed by a plate 17 and connected through a pipe 18 to the steam chamber 14. The other end of the housing 16 is partially closed by a packing gland 19 which surrounds a tubular member indicated generally at 20. The tubular member 20 is formed of three main parts or portions 21, 22 and 23. The intermediate part 22 connecting the rigid end parts 21 and 23 is formed of corrugated sheet metal providing a flexible portion in the tubular member whereby the part 23 may be moved substantially coaxially, as well as laterally, of the part 21 in forming a satisfactory connection between the tubular member and the extrusion head 11. The extrusion head 11 has an adapter 25 mounted thereon with an externally threaded outer end having a frusto-conical inner surface 26. A head 27 is threadedly mounted upon the outer end of the tubular member 20, namely the portion 23 thereof, and has a frusto-conical surface 28 to engage the surface 26 of the adapter 25. A gasket 29 is positioned in the adapter 25 and the head 27 engages this gasket to effect a pressure-tight seal. A connecting element 30 having the general appearance of a hand wheel and functioning as a nut is rotatably mounted on the portion 23 of the tubular member 20 to abut the head 27 and to threadedly engage the threaded portion of the adapter 25.

A cradle 32 is rigidly mounted on the part 21 of the tubular member 20 and extends beneath the flexible part 22 and a portion of the part 23 to support the part 23 when the tubular member is moved into its open position. The cradle 32 includes an arcuate member 33 receivable in a groove 31 formed in a collar 34 which is disposed concentric with the part 23 and is fixedly mounted thereon. The collar 34 supports a bracket 35 which connects the collar as well as the tubular member 20 to one end of a rack 36. The rack 36 is positioned substantially parallel with the tubular member 20 and extends to the left into a longitudinal aperture or bearing portion 37 in the housing 16. A shaft 38 is suitably journalled in the housing 16 and has a pinion 39 mounted thereon and in engagement with the teeth of the rack 36. A hand wheel 40 mounted upon the shaft 36 may be rotated manually to cause rotation of the shaft 38.

When the machine is in operation, the connecting mechanism is in its closed position as illustrated in the drawing. If the wire should break, or if the operator should for any other reason desire to gain access to the wire between the extrusion head 11 and the steam chamber 14, the operator first rotates the element 30 to disconnect the head 27 from the adapter 25. The operator next rotates the hand wheel 40 clockwise to rotate the pinion 39 and thereby move the rack 36 to the left, moving with it the tubular member 20, thus providing an opening between the units 11 and 14 of the machine. At this time, the necessary work on the wire, such as the splicing of the broken ends, may be accomplished, after which the mechanism may be closed by rotating the hand wheel 40 in a counterclockwise direction.

During the closing of the mechanism through the rotation of the hand wheel, the part 23 of the tubular member which also supports the head 27 and the element 30, rests on the arcuate member 33 of the cradle 32. The groove 31 in the collar 34 is somewhat wider than the thickness of the arcuate member 33, and the flexible member 22, to which the collar 34 is attached, is free to move slightly in a longitudinal direction with respect to the arcuate member. The collar rests upon the arcuate member when the connector is open, but is raised off the arcuate member when the connector is closed.

As the head 27 enters the adapter 25, the engaging frusto-conical surfaces 26 and 28 cause lateral movement of the part 23 relative to the part 21 of the tubular member which is made possible through the flexible part 22. The resilient nature of the part 22, permits the part 23 to move laterally, creating a bend in the tubular member 20 until the head 27 is seated centrally in the adapter 25 through first the movement caused by rotation of the hand wheel 40 and finally the movement caused by the rotation of the element 30, completing the pressure-tight connection between the head 27, the gasket 29 and the adapter 25. The flexibility of the member 22 and the width of the groove 31 in the collar 34 permit the slight longitudinal movement of the member 22 necessary to insure a tight seal.

The portions 21 and 23 of the tubular member 20 have been defined as rigid portions in that they are not resilient or flexible. The portion 21 is confined to movement only in a longitudinal path concentric with the path of the wire without any freedom of transverse movement. The unavoidable degree of imperfection in the mounting of the units 11 and 14 at spaced positions, although minute, might be sufficient, should the tubular member 20 be rigid throughout its length, to cause formation of an imperfect seal at its connection with the adapter 25. The presence of the resilient portion 22 allows substantial coaxial and lateral movement of the portion 23 relative to the portion 21 or its longitudinal path, whereby the head 27 may find a perfect seat against the gasket 29 in the adapter 25 and thus form a perfect seal.

Although a specific embodiment of the invention has been shown and described, it will be understood that it is but illustrative and that various modifications may be made therein without departing from the scope and spirit of this invention as defined by the appended claims.

What is claimed is:

1. A flexible connecting mechanism for joining a fixed position extruder to a fixed position vulcanizing tube, comprising an adapter secured to the extruder, a tube slidable longitudinally within the vulcanizing tube, and a flexible end portion on the slidable tube engaging and effecting a pressure tight joint with the adapter.

2. A flexible connecting mechanism in a machine for vulcanizing insulating material on a wire advanced longitudinally in a given path through a fixed position extrusion unit and a fixed position treating unit of the machine, the connecting mechanism for the said units comprising a housing mounted at a fixed position, connected to one of the units and having a chamber therein positioned in the path of the wire, a hollow adapter mounted on the other unit concentric with the path of the wire and having an externally threaded portion, a tubular member having a main portion projecting into the chamber and mounted for movement only in a longitudinal path which may not be concentric with the path of the wire, an end portion for connection with the adapter and an intermediate resilient portion whereby the end portion may be moved relative to the main portion concentric with the path of the wire to form a sealed connection with the adapter, and a threaded element for engagement with the threaded portion of the adapter to secure the end portion of the tubular member thereto.

3. A flexible connecting mechanism in a machine for vulcanizing insulating material on a wire advanced longitudinally in a given path through a fixed position extrusion unit and a fixed position treating unit of the machine, the connecting mechanism for the said units comprising a housing mounted at a fixed position, connected to one of the units and having a chamber therein positioned in the path of the wire, a hollow adapter mounted on the other unit concentric with the path of the wire and having an externally threaded portion, a tubular member having a main portion projecting into the chamber and mounted for movement only in a longitudinal path which may not be concentric with the path of the wire, an end portion for connection with the adapter and an intermediate resilient portion whereby the outer end portion may be moved relative to the inner end portion to form a sealed connection with the adapter, a threaded element for engagement with the threaded portion of the adapter to secure the outer end portion of the tubular member thereto, and means to move the tubular member away from the adapter when freed by the threaded element to expose a portion of the path of the wire.

4. A flexible connecting mechanism in a machine for vulcanizing insulating material on a wire advanced longitudinally in a given path through a fixed position extrusion unit and a fixed position treating unit of the machine, the connecting mechanism for the said units comprising a housing mounted at a fixed position, connected to one of the units and having a chamber therein positioned in the path of the wire, a hollow adapter mounted on the other unit concentric with the path of the wire and having a frusto-conical inner surface and a threaded outer portion, a tubular member having a main portion projecting into the chamber and mounted for movement only in a longitudinal path which may not be concentric with the path of the wire, an end portion for connection with the adapter and an intermediate resilient portion whereby the end portion may be moved relative to the main portion concentric with the path of the wire to form a sealed connection with the adapter, a head mounted on the end portion and having a frusto-conical outer surface for engagement with the frusto-conical surface of the adapter, and a threaded element rotatable on the end portion for engagement with the threaded portion of the adapter to move the head whereby the frusto-conical surface thereof cooperates with the frusto-conical surface of the adapter to align the head with the adapter.

5. In an apparatus including fixed position extruder and a fixed position vulcanizing tube spaced therefrom, a flexible connecting mechanism for joining the extruder and the vulcanizing tube, which comprises an adapter secured to the extruder, and a tube slidable longitudinally with respect to the vulcanizing tube and having an end portion designed to engage and effect a pressure tight joint with the adapter, at least a portion of the tube being flexible to permit centering of the end portion with respect to the adapter.

6. In an apparatus including fixed position extruder and a fixed position vulcanizing tube spaced therefrom, a flexible connecting mechanism for joining the extruder and the vulcanizing tube, which comprises an adapter secured to the extruder and having an inclined surface thereon, and a tube slidable longitudinally with respect to the vulcanizing tube and having an end portion provided with an inclined surface designed to cooperate with the inclined surface on the adapter to align the tube with the adapter, at least a portion of the tube being flexible to permit such alignment.

7. In an apparatus including fixed position extruder and a fixed position vulcanizing tube spaced therefrom, a flexible connecting mechanism for selectively joining the extruder and the vulcanizing tube, which comprises an adapter secured to the extruder, a tube slidable longitudinally with respect to the vulcanizing tube, a tube aligned therewith and designed to engage and effect a pressure-tight joint with the adapter, and a flexible tube connecting the two first-mentioned tubes to permit centering of the second-mentioned tube with respect to the adapter.

8. In an apparatus including fixed position extruder and a fixed position vulcanizing tube spaced therefrom, a flexible connecting mechanism for selectively joining the extruder and the vulcanizing tube, which comprises an adapter secured to the extruder, a tube slidable longitudinally within the vulcanizing tube, a tubular connecting member aligned with the slidable tube and designed to engage and effect a pressure-tight joint with the adapter, and a corrugated tubular member connecting the slidable tube with the tubular connecting member, whereby the connecting member may be moved laterally and longitudinally with respect to the slidable tube to permit alignment of the connecting member with the adapter.

9. A flexible connecting mechanism in a machine for vulcanizing insulating material on a wire advanced longitudinally in a given path through a fixed position extrusion unit and a fixed position treating unit of the machine, the connecting mechanism for the said units comprising a housing mounted at a fixed position, connected to one of the units and having a chamber therein positioned in the path of the wire, a hollow adapter mounted on the other unit concentric with the path of the wire and having an externally threaded portion, a tubular member having a main portion projecting into the chamber and mounted for movement only in a longitudinal path which may not be concentric with the path of the wire, an end portion for connection with the adapter and an intermediate resilient portion whereby the end portion may be moved relative to the main portion concentric with the path of the wire to form a sealed connection with the adapter, a cradle rigidly supported by the main portion and extending beneath the resilient portion and the end portion to support the last two portions when in open position, and a threaded element for engagement with the threaded portion of the adapter to secure the end portion of the tubular member thereto.

KARL C. EDWARDS.
DAVID D. JONES.

REFERENCES CITED

The following references are of record in the file of this patent:

UNITED STATES PATENTS

| Number | Name | Date |
| --- | --- | --- |
| 396,908 | Wiseman | Jan. 29, 1889 |
| 1,689,206 | Lamplough | Oct. 30, 1928 |
| 1,788,527 | Kivley | Jan. 13, 1931 |
| 2,218,138 | Stricklen | Oct. 15, 1940 |
| 2,278,152 | Semar | Mar. 31, 1942 |
| 2,291,344 | Powell | July 28, 1942 |
| 2,337,038 | Fentress | Dec. 21, 1943 |
| 2,454,557 | Jacobson | Nov. 23, 1948 |